US011330013B2

(12) United States Patent
Rambo et al.

(10) Patent No.: US 11,330,013 B2
(45) Date of Patent: May 10, 2022

(54) METHOD AND DEVICE FOR MONITORING DATA COMMUNICATIONS

(71) Applicant: Robert Bosch GmbH, Stuttgart (DE)

(72) Inventors: Joshua Rambo, Wixom, MI (US); Liem Dang, Ludwigsburg (DE); Benjamin Herrmann, Ludwigsburg (DE); Mario Gonzalez Fernandez, Korntal-Muenchingen (DE); Jan Holle, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 374 days.

(21) Appl. No.: 16/592,908

(22) Filed: Oct. 4, 2019

(65) Prior Publication Data

US 2020/0128041 A1 Apr. 23, 2020

(30) Foreign Application Priority Data

Oct. 19, 2018 (DE) .......................... 102018217964.6

(51) Int. Cl.
*G06F 11/00* (2006.01)
*H04L 29/06* (2006.01)
(Continued)

(52) U.S. Cl.
CPC .... *H04L 63/1466* (2013.01); *H04L 12/40006* (2013.01); *H04L 12/40013* (2013.01);
(Continued)

(58) Field of Classification Search
CPC . H04L 63/1466; H04L 63/14; H04L 63/1416; H04L 12/40026; H04L 12/40006;
(Continued)

(56) References Cited

U.S. PATENT DOCUMENTS 4,825,204 A * 4/1989 Nakamura ............ H04L 12/417
340/531
5,283,571 A * 2/1994 Yang ...................... H04L 41/00
340/9.16
(Continued)

FOREIGN PATENT DOCUMENTS

DE 102015205670 A1 6/2016
EP 3319275 A1 5/2018
WO 2010145985 A1 12/2010

OTHER PUBLICATIONS

Allen-Bradley's "DeviceNet Communication Module", Catalog No. 160-DN2, Publication 0160-5.18—Jun. 2003, 116 pages (Year: 2003).*

*Primary Examiner* — Richard G Keehn
(74) *Attorney, Agent, or Firm* — Norton Rose Fulbright US LLP; Gerard Messina

(57) ABSTRACT

A method for monitoring data communications in a communications system, which includes a plurality of subscribers and a communications medium jointly usable by the subscribers. The method includes the following steps: ascertaining the subscribers of the communications system; forming a first collection of possible messages, which may be sent by at least one of the ascertained subscribers via the communications medium; and ascertaining messages transmitted via the communications medium; evaluating the ascertained messages.

17 Claims, 4 Drawing Sheets

(51) Int. Cl.
  *H04L 12/40* (2006.01)
  *H04L 43/0823* (2022.01)
  *H04L 43/16* (2022.01)
  *H04L 43/0811* (2022.01)
  *H04L 41/0873* (2022.01)
  *H04L 41/0681* (2022.01)
  *H04L 41/0677* (2022.01)

(52) U.S. Cl.
  CPC .... *H04L 12/40026* (2013.01); *H04L 41/0677* (2013.01); *H04L 41/0681* (2013.01); *H04L 41/0873* (2013.01); *H04L 43/0811* (2013.01); *H04L 43/0823* (2013.01); *H04L 43/16* (2013.01); *H04L 63/14* (2013.01); *H04L 63/1416* (2013.01); *H04L 2012/40215* (2013.01)

(58) Field of Classification Search
  CPC ........... H04L 12/40013; H04L 43/0823; H04L 43/0811; H04L 43/16; H04L 2012/40215; H04L 41/0677; H04L 41/0873; H04L 41/0681
  See application file for complete search history.

(56) References Cited

U.S. PATENT DOCUMENTS

| | | | |
|---|---|---|---|
| 2014/0298133 A1* | 10/2014 | Hartwich | H03M 13/09 714/758 |
| 2016/0373449 A1 | 12/2016 | Haga et al. | |
| 2018/0159870 A1 | 6/2018 | Tanabe et al. | |
| 2018/0337938 A1* | 11/2018 | Kneib | H04L 63/0876 |
| 2019/0082377 A1* | 3/2019 | Silver | G08G 1/096741 |
| 2019/0274015 A1* | 9/2019 | Surnilla | G07C 5/0808 |
| 2020/0128041 A1* | 4/2020 | Rambo | H04L 12/40026 |

* cited by examiner

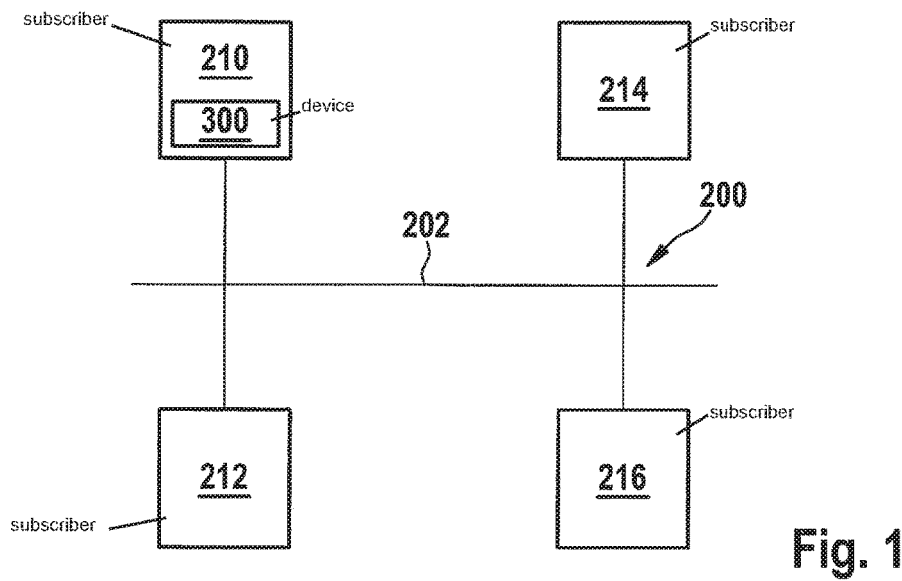
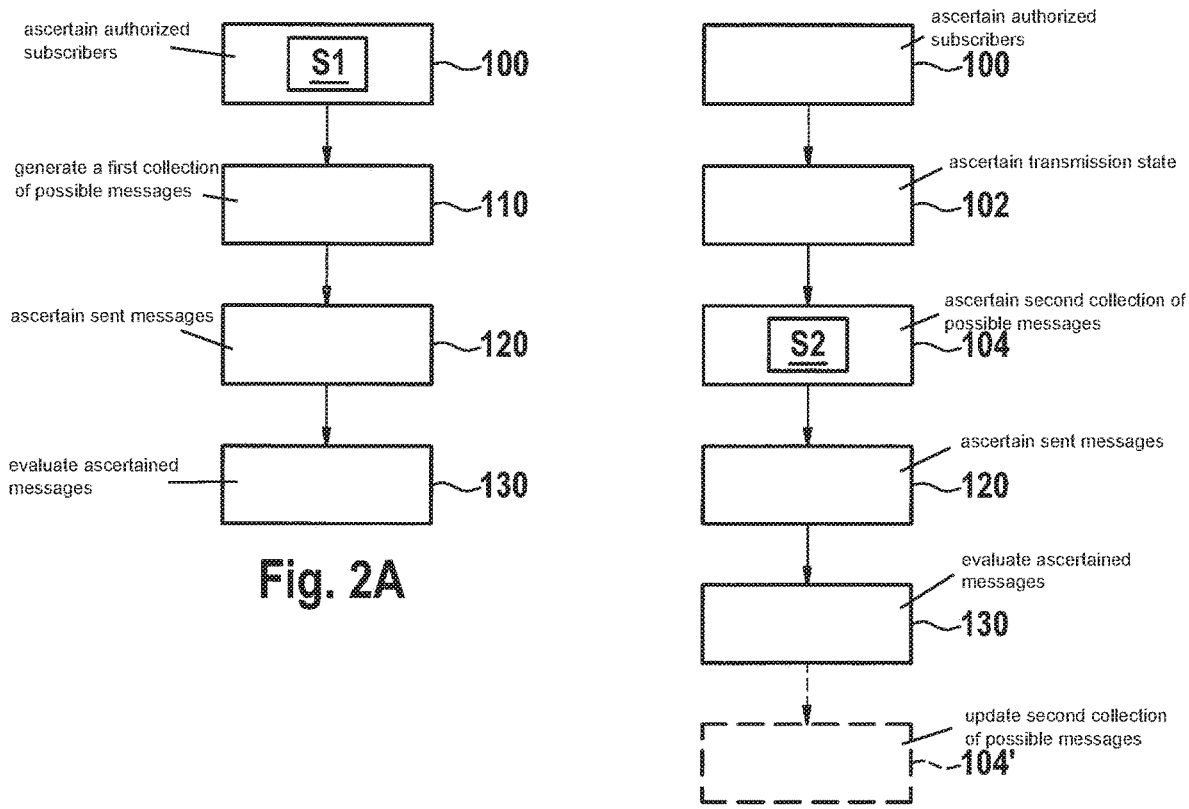

METHOD AND DEVICE FOR MONITORING DATA COMMUNICATIONS

CROSS REFERENCE

The present application claims the benefit under 35 U.S.C. 119 of German Patent No. DE 102018217964.6 filed on Oct. 19, 2018, which is expressly incorporated herein by reference in its entirety.

FIELD

The present invention relates to a method for monitoring data communications in a communication system, which includes a plurality of subscribers and has a communications medium (shared medium) jointly usable or shared by the subscribers.

The present invention also relates to a device for implementing such a method.

BACKGROUND INFORMATION

Conventional methods and devices for monitoring data communications generally require special hardware and/or complex signal processing.

SUMMARY

An object of the present invention to improve a method and a device for monitoring data communications is to reduce or prevent the disadvantages of the related art.

Preferred specific embodiments of the present invention include a method for monitoring data communications in a communications system, which includes a plurality of subscribers and has a communications medium jointly usable by the subscribers (or shared (in particular, among the subscribers)); the method including the following steps: ascertaining the subscribers of the communications system; forming a first collection, in particular, e.g., a list, of possible messages, which may be sent by at least one of the ascertained subscribers via the communications medium; ascertaining messages sent via the communications medium; evaluating the ascertained messages. During the evaluation of the ascertained messages, which, therefore, have actually been sent via the communications medium, the first collection may be advantageously considered, which means that ascertained messages may be compared, for example, to the first collection. This allows efficient monitoring of the data communications in the communications system; in particular, the monitoring not requiring any expensive, special hardware or complex signal processing. On the contrary, the knowledge characterized by the first collection is advantageously used; the knowledge possibly being available during the construction of the communications system and/or being ascertainable then or later without much effort.

"Subscriber" or "subscriber device" is presently understood as any technical device or any technical system, which is configured or suited to enter into data communication with other subscribers via the (shared) communications medium, thus, for example, to send and receive messages via the communications medium to and from one or more other subscribers, respectively. If the communications system includes, for example, a CAN bus, the above-mentioned subscriber and/or the subscriber device may have, for example, a CAN transceiver for data communications via the CAN bus.

In further preferred specific embodiments, it is provided that the method further include the following steps: a) ascertaining a transmission state of at least one ascertained subscriber, preferably, of a plurality of, or of all the ascertained subscribers; b) for the at least one ascertained subscriber, preferably, for the plurality of, or all of the ascertained subscribers, ascertaining a second collection of possible messages, which may be sent via the communications medium, by the at least one, or the plurality of, preferably, by all of the ascertained subscribers, as a function of the specific transmission state of the ascertained subscriber in question; in particular, the evaluating of the ascertained messages being carried out as a function of the second collection. This renders possible particularly precise monitoring of the data communications.

In further preferred specific embodiments, the second collection is updated, preferably repeatedly; in particular, the second collection being updated a) periodically and/or b) as a function of a, preferably, current transmission state of the at least one ascertained subscriber, and/or c) as a function of at least one ascertained message.

In further preferred specific embodiments, it is provided that the evaluating include: in the ascertained messages, checking if at least one message is present, which is not included in the second collection. This may indicate, for example, a manipulation attempt (e.g., injection of the message by an attacker).

In further preferred specific embodiments, it is provided that the evaluating of the ascertained messages include: ascertaining a frequency of the messages sent by at least one particular, ascertained subscriber (in particular, ascertaining the frequency of messages of the same type; in the case of CAN bus systems, e.g., ascertaining a frequency of messages having the same CAN ID).

In further preferred specific embodiments, it is provided that the evaluating of the ascertained messages additionally include the following steps: comparing the ascertained frequency to a frequency specified for the particular, ascertained subscriber (and/or for the relevant message type (e.g., CAN ID); and, optionally, initiating an error response, if the ascertained frequency does not agree with the frequency specified for the particular, ascertained subscriber (and/or for the message type in question).

In further preferred specific embodiments, it is provided that the evaluating additionally include: checking if the ascertained frequency falls below a specifiable, first threshold value and/or exceeds a specifiable, second threshold value and/or is identical to zero; and, optionally, initiating an error response, if the ascertained frequency falls below the specifiable, first threshold value and/or exceeds the specifiable, second threshold value and/or is identical to zero.

In further preferred specific embodiments, an error response may generally be initiated, e.g., if a collection is checked against communications or messages on the network, and if, in this context, e.g., at least one anomaly is detected.

In further preferred specific embodiments, it is provided that the method include the following steps: checking if all of the messages transmittable by a particular subscriber are contained in the ascertained messages; deducing a manipulation attempt, if not all of the messages transmittable by the particular subscriber are included in the ascertained messages; in particular, deducing a manipulation attempt, if not all of the messages transmittable by the particular subscriber are contained in the ascertained messages within a specifiable waiting time. In further preferred specific embodiments, the specifiable waiting time may be monitored with the aid of a timer.

In further preferred specific embodiments, it is provided that the method include the following steps: checking if messages transmittable by a particular subscriber are contained in the ascertained messages; deducing a manipulation attempt, if some, but not all of the messages transmittable by the particular subscriber are included in the ascertained messages. This advantageously allows, e.g., communications or messages actually occurring to be compared to expected communications or messages for each subscriber. If, e.g., all of the communications of a subscriber are absent, this indicates its complete malfunction. If only a portion of the communications of a subscriber are absent, this indicates an attack (masquerade).

Further preferred specific embodiments relate to a device for monitoring data communications in a communications system, which includes a plurality of subscribers and has a communications medium jointly usable by the subscribers; the device being configured to execute the following steps: ascertaining the subscribers of the communications system; forming a first collection of possible messages, which may be sent by at least one of the ascertained subscribers via the communications medium; ascertaining messages sent via the communications medium; evaluating the ascertained messages.

In further preferred specific embodiments, it is provided that the device be configured to execute the method in accordance with the specific embodiments.

Further preferred specific embodiments relate to a subscriber or a subscriber device (e.g., CAN transceiver, in the case of a CAN bus system) for a communications system, which has a shared communications medium jointly usable by a plurality of subscribers; the subscriber having at least one device according to the specific embodiments.

Further preferred specific embodiments relate to a communications system, which includes a (shared) communications medium jointly usable by a plurality of subscribers, as well as at least one subscriber according to the specific embodiments and/or at least one device according to the specific embodiments; in particular, the communications system taking the form of a CAN (controller area network) system or CAN FD (flexible data rate) system.

Further preferred specific embodiments relate to use of the method according to the specific embodiments and/or of the device according to the specific embodiments and/or of the subscriber according to the specific embodiments and/or of the communications system according to the specific embodiments, for monitoring the communications system for a fault and/or for manipulation of at least one subscriber.

Further advantageous refinements of the present invention are described herein.

The example embodiments according to the present invention may advantageously allow manipulation of the communications system and/or of at least one subscriber to be detected efficiently, without the provision of additional hardware, in particular, special hardware. In particular, this allows so-called man-in-the-middle attacks and/or masquerading attacks to be detected.

Additional features, uses and advantages of the present invention ensue from the following description of exemplary embodiments of the present invention, which are illustrated in the figures. In this context, all of the described or illustrated features form the subject matter of the present invention, either alone or in any combination, irrespective of their combination, wording or representation in the description herein and in the figures.

BRIEF DESCRIPTION OF THE DRAWINGS

FIG. 1 shows a simplified block diagram of a communications system according to a specific embodiment of the present invention.

FIG. 2A shows a simplified flow chart of a method according to a specific embodiment of the present invention.

FIG. 2B shows a simplified flow chart of a method according to a further specific embodiment.

DETAILED DESCRIPTION OF EXAMPLE EMBODIMENTS

FIG. 1 schematically shows a simplified block diagram of a communications system 200 according to a specific embodiment. Communications system 200 includes a shared communications medium (shared medium) 202 (that is, usable by a plurality of subscribers), via which a plurality of subscribers 210, 212, 214, 216 of communications system 200 may enter into data communication with each other (for example, sending and/or receiving messages via communications medium 202). For example, communications system 200 may take the form of a CAN or CAN FD system. Accordingly, communications medium 202 represents, by way of example, a CAN bus, and subscribers 210, 212, 214, 216 are configured to communicate with each other via the CAN bus.

Figure 2C:
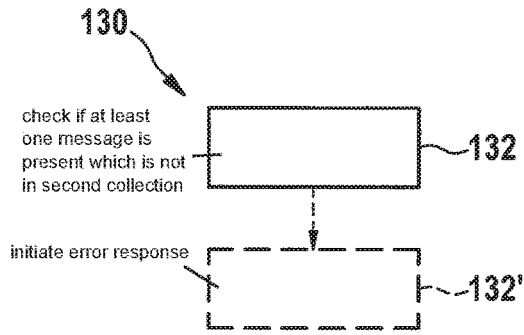
FIG. 2C shows a simplified flow chart of a method according to a further specific embodiment.

In particularly preferred specific embodiments of the present invention, a method for monitoring the data communications in communications system 200 is provided. To this end, FIG. 2A schematically shows a simplified flow chart of a specific embodiment of the method. In a first step 100, (in particular, authorized) subscribers 210, 212, 214, 216 of communications system 200 are ascertained. This is used, for example, to determine which subscribers are present, and from which subscribers messages accordingly sent within the scope of the data communications to be monitored, are to be expected. In a subsequent step 110, a first collection S1 of possible messages, which may be sent via communications medium 202 by at least one of subscribers 210, 212, 214, 216, is generated, e.g., in the form of a list or table or the like. In the following step 120, messages sent via communications medium 202 are ascertained, and in step 130, the ascertained messages are evaluated. In particularly preferred specific embodiments, the evaluation according to step 130 may take place in view of first collection S1.

In further preferred specific embodiments, first collection S1 may constitute a so-called positive list or "white list," that is, a list of all possible messages, which may be sent by at least one of the ascertained, authorized subscribers via communications medium 202. If, for example, in step 130, it is then determined that the messages ascertained in step 120 include at least one message, which is not contained in first collection S1, then manipulation of communications system 200 or of at least one subscriber may be deduced.

In other words, during evaluation 130 of the ascertained messages, which, therefore, have actually been sent via communications medium 202, first collection S1 may be taken into consideration, which means that ascertained messages may be compared, for example, to first collection S1. This allows efficient monitoring of the data communications in communications system 200; the monitoring not requiring, in particular, any expensive, special hardware or complex signal processing. On the contrary, the knowledge characterized by first collection S1 is advantageously used; the knowledge possibly being available during the construction of communications system 200, and/or being ascertainable then or later without much effort.

In particularly preferred specific embodiments, a device 300, which is configured to execute the method in accordance with the specific embodiments, is integrated in at least one of subscribers 210. Presently, this is indicated schematically in FIG. 1 for first subscriber 210.

In further preferred specific embodiments, the ascertaining of the subscribers according to step 100 from FIG. 2A may be accomplished, for example, by monitoring the communications on communications medium 202; the monitoring preferably taking place in an operating phase of communications system 200, in which it may be assumed that no manipulation is currently being carried out or is present. Alternatively, or in addition, the ascertaining of the subscribers according to step 100 from FIG. 2A may also be carried out, for example, with the aid of a configuration, in which the authorized subscribers are specified to device 300.

"Subscriber" or "subscriber device" is presently understood as any technical device or any technical system, which is configured or suited to enter into data communication with other subscribers via shared communications medium 202, thus, for example, to send and receive messages via communications medium 202 to and from one or more other subscribers, respectively. If communications system 200 includes, for example, a CAN bus, as is presently the case with reference to FIG. 1, the above-mentioned subscriber and/or the subscriber device may have, for example, a CAN transceiver for the data communications via the CAN bus. Therefore, the above-mentioned messages may be distinguished in an appropriate manner, for example, using their CAN ID.

In further preferred specific embodiments, it is provided that the method further include the following steps: ascertaining a transmission state of at least one ascertained subscriber, preferably, of a plurality of, or of all the ascertained subscribers; and then, for the at least one ascertained subscriber, preferably, for the plurality of, or all of the ascertained subscribers, ascertaining a second collection S2 of possible messages, which may be sent via the communications medium by the at least one, or the plurality of, preferably, all of the ascertained subscribers, as a function of the specific transmission state of the ascertained subscriber in question; in particular, the evaluating of the ascertained messages being carried out as a function of second collection S2. This renders possible particularly precise monitoring of the data communications. In further preferred specific embodiments, the specific embodiment mentioned above, and/or individual steps from it, may also be combined in an advantageous manner with the specific embodiment described above with reference to FIG. 2A.

This is illustrated exemplarily in the simplified flow chart according to FIG. 2B. In step 100, the subscribers of communications system 200 are initially ascertained; in step 102, a transmission state of at least one ascertained subscriber, preferably, of a plurality of, or of all ascertained subscribers 210, 212, 214, 216, is ascertained; in step 104, second collection S2 of possible messages, which are transmittable by ascertained subscribers 210, 212, 214, 216 via communications medium 202, is ascertained as a function of the specific transmission state of the ascertained subscriber 210, 212, 214, 216 in question; in step 120, messages sent via communications medium 202 are ascertained; in step 130, the messages ascertained in step 120 are evaluated; in particular, in the specific embodiment according to FIG. 2B, the evaluating 130 of the ascertained messages provides for the evaluating of the ascertained messages as a function of second collection S2. This advantageously allows the messages ascertained in step 120 to be compared to the second collection S2. Since, in contrast to the first collection S1 already described above, second collection S2 additionally takes into account specific transmission states of the ascertained subscribers 210, 212, 214, 216 in question, it accordingly has more specific data about currently permissible messages to be sent, than first collection S1. Accordingly, an even more exact check of communications system 200 for instances of manipulation may be carried out, using second collection S2.

In further specific embodiments, second collection S2 may also be referred to as a white list specific to the transmission state, or as a "selective" white list, since it only contains messages, which may be sent by corresponding, authorized subscribers in view of their specific, current transmission state, but not, for example, other messages, which may indeed be sent, in principle, by an authorized subscriber, but the current transmission of which is ruled out due to the current transmission state of the subscriber in question.

For example, in further specific embodiments, first collection S1 may include four (CAN) communications for a subscriber considered, e.g., having the CAN ID's 0x222, 0x560, 0x276 and 0x223, whereas the second collection S2 for the considered subscriber, formed in a current transmission state, only includes three (CAN) communications having, namely, the CAN ID's 0x222, 0x560 and 0x276. If, e.g., a further CAN communication having the CAN ID 0x223 is now received, then manipulation is advantageously detected.

In further specific embodiments, for example, second collection S2 for subscriber 212 may contain a total of three messages, namely, a first CAN communication having the first CAN ID 0x222, a second CAN communication having the second CAN ID 0x560, and a third CAN communication having the third CAN ID 0x276. Accordingly, these three CAN communications may be sent via communications medium 202 in the current transmission state of subscriber 212. If, for example, the step of evaluation 130 (FIG. 2B) reveals that a CAN communication having the CAN ID 0x223 is included among the messages ascertained in step 120, then an instance of manipulation of communications system 200 and/or of subscriber 212 may be deduced accordingly.

In further preferred specific embodiments, second collection S2 is updated, preferably repeatedly, cf. optional step 104' from FIG. 2B; in particular, the second collection S2 being updated a) periodically and/or b) as a function of a, preferably, current transmission state of the at least one ascertained subscriber, and/or c) as a function of at least one ascertained message (e.g., from step 120). In this manner, it is ensured that the inventory of currently permissible messages of collection S2 is always current, which means that particularly accurate monitoring may take place.

In further preferred specific embodiments, it is provided that the evaluating 130 (FIG. 2B, 2C) include: in the messages ascertained (in step 120), checking 132 (FIG. 2C) if at least one message is present, which is not included in second collection S2. In this case, for example, an error response 132' may be initiated, for example, the signaling of an irregular state or a suspicion of a manipulation attempt at a further unit, for example, at another or all of the other subscribers of communications system 200, and/or at an external unit 350 (FIG. 3).

Figure 2D:
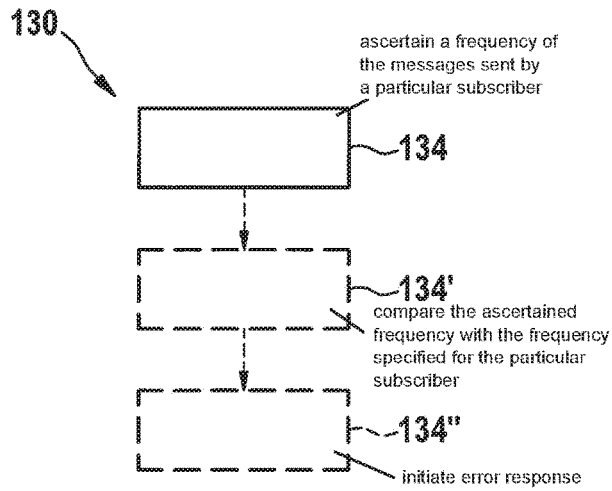
FIG. 2D shows a simplified flow chart of a method according to a further specific embodiment.

In further preferred specific embodiments, cf. FIG. 2D, it is provided that the evaluating 130 of the ascertained messages include: ascertaining 134 a frequency of the messages sent by at least one particular, ascertained subscriber 214 (FIG. 1). In further preferred specific embodiments, it is provided that the evaluating 130 of the ascertained messages additionally include the following steps: comparing 134' the ascertained frequency to a frequency specified for the particular, ascertained subscriber 214; and, optionally, initiating 134" an error response, if the ascertained frequency does not agree with the frequency specified for the particular, ascertained subscriber 214. In further specific embodiments, it is particularly preferable for the above-described ascertainment 134 of the frequency and the further evaluation according to FIG. 2D to be combined with the specific embodiments according to FIG. 2A and/or 2B and/or 2C.

Figure 2E:
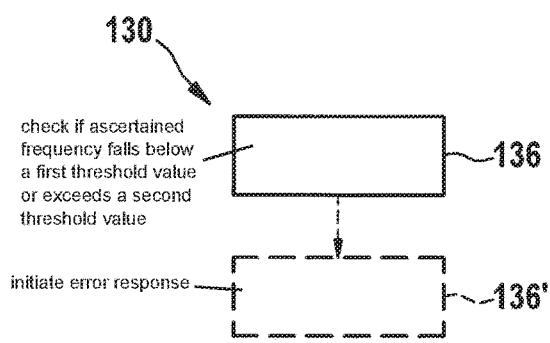
FIG. 2E shows a simplified flow chart of a method according to a further specific embodiment.

In further preferred specific embodiments, cf. FIG. 2E, it is provided that the evaluating 130 additionally include: checking 136 if the ascertained frequency falls below a specifiable, first threshold value and/or exceeds a specifiable, second threshold value and/or is identical to zero; and, optionally, initiating an error response 136', if the ascertained frequency falls below the specifiable, first threshold value and/or exceeds the specifiable, second threshold value and/or is identical to zero. In this manner, manipulation attempts may also be ascertained accurately in an advantageous manner, for example, in the complete absence of messages of a relevant subscriber contained in the first and/or second collection S1, S2, the deactivation, by an attacker, of a subscriber actually authorized and/or other measures of an attacker, which have an effect on a frequency of the messages sent by the authorized subscriber.

Figure 3:
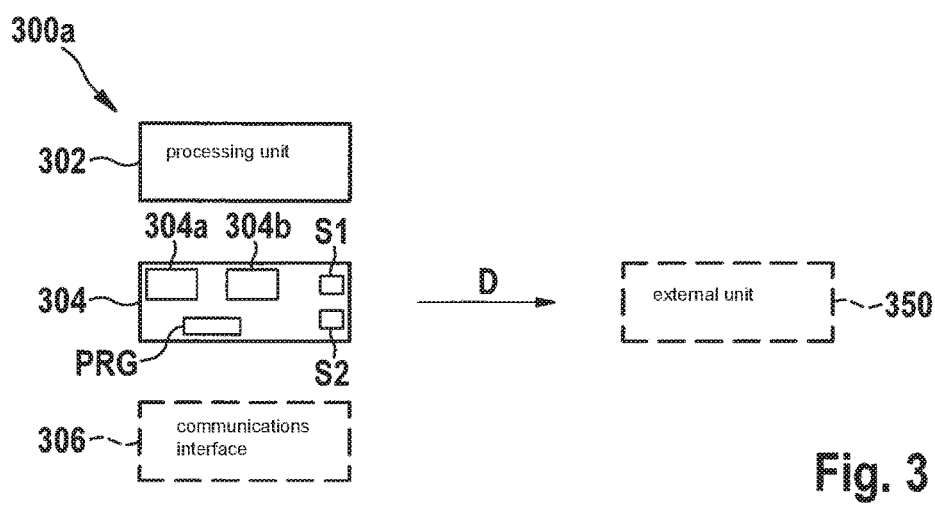
FIG. 3 shows a simplified block diagram of a device according to a specific embodiment.

FIG. 3 schematically shows a simplified block diagram of a device 300a according to a specific embodiment, which is configured to execute at least one method for monitoring the data communications in communications system 200 in accordance with the specific embodiments. For example, device 300 according to FIG. 1 may have the configuration 300a according to FIG. 3. Device 300a includes a processing unit 302, which has, for example, a microprocessor and/or digital signal processor (DSP) and/or microcontroller and/or an application-specific, integrated circuit (ASIC) and/or a programmable logic chip, in particular, an FPGA (field programmable gate array), or the like, and/or a combination of them. Device 300a further includes a storage unit 304, which preferably has a volatile memory 304a, in particular, a main memory store (RAM) and/or a nonvolatile memory 304b, in particular, a flash EEPROM. Storage unit 304 is configured to at least temporarily store data processed during the execution of the method according to the specific embodiments, for example, data of ascertained subscribers 210, . . . , 216 and/or data of first collection S1 and/or data of second collection S2 and/or ascertained messages and/or data, which are used for evaluation 130, or which are retained during evaluation 130.

It is also particularly preferable for storage unit 304 to be configured to store at least one computer program PRG at least temporarily; computer program PRG being designed to be executed by processing unit 302 and, in this manner, e.g., to implement a method according to the specific embodiments, in device 300a.

In further, preferred specific embodiments, device 300a may also have an optional communications interface 306, which allows, for example, messages to be sent and/or received via communications medium 202. In further preferred specific embodiments, in addition to the data communications regarding communications medium 202, communications interface 306 may also, as an option, be configured to allow data communication of device 300a with another unit 350, in particular, outside of communications system 200; for example, the error responses described above, or data D derived from them, being able to be sent to the unit.

Further preferred specific embodiments relate to a subscriber 210, 212, 214, 216 or a subscriber device for communications system 200. One or more devices 300, 300a according to the specific embodiments may preferably be provided in at least one subscriber 210, 212, 214, 216 of communications system 200, which means that comprehensive and also, in particular, mutual monitoring by subscribers 210, 212, 214, 216 on the basis of the principle according to the specific embodiments is rendered possible.

Further preferred specific embodiments relate to a communications system 200, which includes a communications medium 202 jointly usable by a plurality of subscribers (that is, shared among the subscribers), as well as at least one subscriber 210 according to the specific embodiments and/or at least one device 300, 300a according to the specific embodiments; in particular, the communications system taking the form of a CAN (controller area network) system or CAN FD (flexible data rate) system. In further preferred specific embodiments, communications system 200 may also operate according to a communications standard different from the CAN or CAN FD standard mentioned above by way of example. In further preferred specific embodiments, it is also conceivable to provide at least one device 300, 300a according to the specific embodiments, in communication system 200; in further specific embodiments, in departure from the configuration exemplarily shown in FIG. 1, it being possible to position the at least one device 300, 300a outside of a subscriber, for example, as a separate, external device, which is connected to communications medium 202.

Further preferred specific embodiments relate to use of the method according to the specific embodiments and/or of device 300, 300a according to the specific embodiments and/or of subscriber 210, 212, 214, 216 according to the specific embodiments and/or of communications system 200 according to the specific embodiments, for monitoring communications system 200 for a fault and/or for manipulation of, in particular, at least one subscriber.

In the following, further advantageous specific embodiments are described with reference to the flow charts according to FIGS. 4, 5, 6, and 7.

Figure 4:
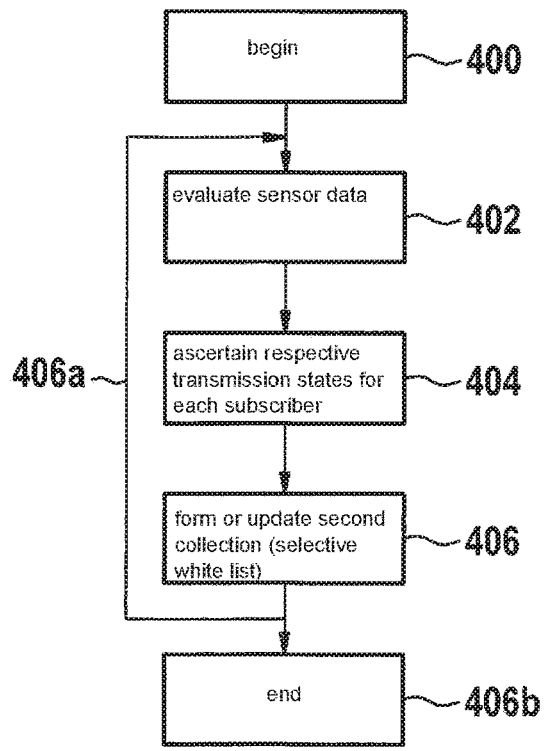
FIG. 4 shows a simplified flow chart of a method according to a further specific embodiment.

FIG. 4 schematically shows a functional sequence according to further preferred specific embodiments, in which a transmission state is ascertained and second collection S2, which may be regarded as a "selective white list," is updated; compare the specific embodiment described above with reference to step 104' of FIG. 2B, as well. In step 400 according to FIG. 4, the determination of the transmission state of at least one subscriber 210 begins. In step 402, the data communications on communications medium 202 are evaluated, for example, by device 300 (FIG. 3).

As an option, sensor data of, for example, device 300 are also evaluated in step 402. In further preferred specific embodiments, e.g., a transmission state, such as power management, may be ascertained by analyzing the network (e.g., by evaluating contents of communications), and/or using other information, which device 300 may obtain through subscriber 210, e.g., using internally available data, which were read in by communications system 200 via an ADC (analog-to-digital converter) input.

Then, in step 404, the respective transmission states are ascertained for each subscriber 210, 212, 214, 216 of communications system 200. In further preferred specific embodiments, in step 404, at least one of the following elements may be considered for ascertaining the transmission state of a specific subscriber:

1. Energy management (power management) and/or consideration of different operating states, in particular, energy-saving states, of subscribers. For example, some subscribers may be switched off, while at the same time, other subscribers of the communications system are switched on and actively participate in the data communications over the communications system. In applications in the automotive industry, this applies, for example, to subscribers and/or to control units containing the subscribers, which are only active, for example, when the ignition of the motor vehicle is switched on. A subscriber, which is currently deactivated, will obviously not send any messages over the communications system.

2. Network management, partial disconnection of network segments and/or of segments of communications system 200 (partial networking). In further specific embodiments, it is possible to control the transmission state of a subscriber, for example, using messages, which are sent to the subscriber in question by another subscriber. The control may have, as an object, e.g., temporary deactivation of the subscriber in question and/or inducing the subscriber not to send one or some specifiable messages anymore or for a specifiable period of time, and the like.

3. Diagnostic commands: using diagnostic protocols or diagnostic commands, it is possible to control a transmission state of a subscriber in question, e.g., by resetting it to a specifiable operating state or system state, for example, through activation of a boot loader, in which specifiable operating state or system state not all of the messages or, at least temporarily, no more messages at all, are sent by the subscriber in question. In this connection, in further specific embodiments, a service for communications control according to ISO 14229 may be used, for example, in order to at least temporarily activate or deactivate particular messages to be sent by a subscriber in question.

In the determination of the transmission state of a subscriber in question, consideration of one or more of the above-mentioned aspects, which is possible in further specific embodiments, allows for especially accurate monitoring of the data communications in communications system 200. In further specific embodiments, it is particularly preferable to ascertain the transmission states of all subscribers of communications system 200 in a corresponding manner, in particular, in view of at least one of the above-mentioned aspects 1., 2., 3., or of at least parts of them.

Finally, in the method according to FIG. 4, the selective white list, for example, in the form of second collection S2, is formed and/or updated in step 406, on the basis of the data ascertained in steps 402, 404 and, optionally, further data, provided that it was already generated beforehand (or, in accordance with a further specific embodiment, was already predetermined by configuration). In further preferred specific embodiments, for example, configuration data for at least one subscriber of the communications system may also be used for forming the selective white list or second collection S2. For the example used presently, an example of this is to additionally incorporate preconfigured CAN matrices of the specific subscribers for ascertaining second collection S2; the preconfigured CAN matrices representing the data about which message (for example, having which CAN ID) should be sent by which subscriber at which time and/or at which frequency.

In further preferred specific embodiments, for ascertaining second collection S2, it may also be taken into consideration, when the messages defined by the configuration (e.g., CAN matrices) are sent, in particular, as a function of which transmission state of the subscriber in question.

In further preferred specific embodiments, communication relationships between a plurality of subscribers 210, 212 may also be advantageously considered in the determination of second collection S2. For example, one or more possible transmission states of a first subscriber may be influenced by one or more possible transmission states of a second subscriber and/or by messages sent or not sent by the second subscriber. This interaction may also be considered in an advantageous manner in the generation of second collection S2, which means that complex usage scenarios may also be reproduced, such as the forwarding of messages among several subscribers of communications system 200 or between different communications systems or networks. The above-described consideration of this interaction may allow the data communications in communications system 200 to be monitored even more precisely.

In further preferred specific embodiments of the method according to FIG. 4, after the execution of step 406, the method branches back again to step 402, cf. arrow 406a, so that above-mentioned operations 402, 404, 406 are repeated. It is particularly preferable for these operations to be continually repeated or at least occasionally repeated in a periodic manner, in order to be able to supply correct data in the selective white list (corresponds to second collection S2) at any time. In particular, this may also allow sudden or dynamic changes of a transmission state (occurring during the operation of communications system 200 and/or of a subscriber) to be taken into consideration.

In further specific embodiments, after step 406, it is also possible to branch directly to step 406b, which characterizes an end of the determination or updating of the transmission state.

In the following, e.g., the detection of masquerade attacks according to further preferred specific embodiments is described with reference to the flow chart shown in FIG. 5. The method begins in step 500. In step 502, the data communications on communications medium 202 (that is, the messages sent on communications medium 202) are ascertained, and in the following step 504, it is checked if a considered message of the messages ascertained beforehand in step 502 is included in the selective white list, that is, in second collection S2. If yes, then the method branches to step 506 (end), cf. arrow 504a. If no, then the method branches from step 504, via arrow 504b, to step 508, in which the presence of a masquerade attack is deduced and a corresponding error response is initiated (for example, signaling D a detected manipulation attempt to an external unit 350 (FIG. 3)). The basis of this is the consideration, that if an ascertained message is not contained in second collection S2, then it has been fed into communications medium 202 by an unauthorized attacker. In this respect, step 508 according to FIG. 5 corresponds, for example, to step 132' according to FIG. 2C.

Figure 5:
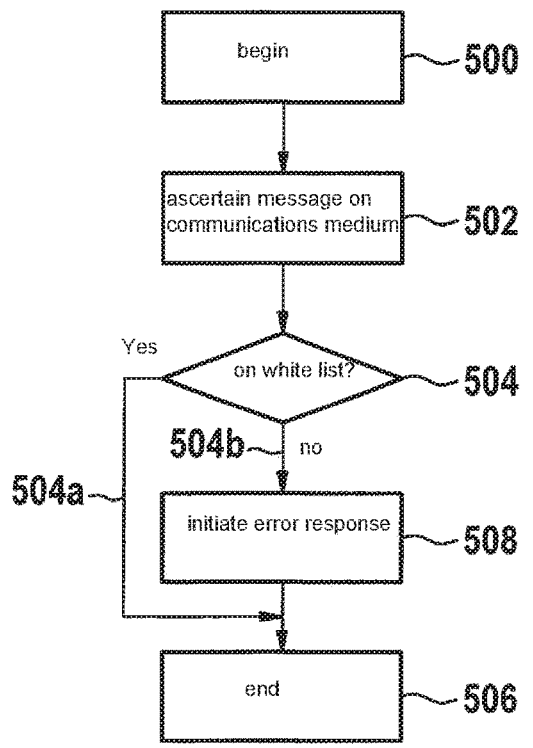
FIG. 5 shows a simplified flow chart of a method according to a further specific embodiment.

In further preferred specific embodiments, steps 502, 504 according to FIG. 5 include ascertaining each message sent via communications medium 202 and checking each of the ascertained messages for its presence in selective white list S2.

In further preferred specific embodiments, the principle according to the above-described specific embodiments, in particular, the use of the selective white list, that is, of second collection S2, may be advantageously used to supplement and/or improve other methods for monitoring the data communications in the communications system, which are possibly executed simultaneously to the above-described methods, and which are based, in particular, on a presence of messages and/or a frequency, at which messages are sent by a subscriber in question. The above-mentioned principle is also applicable to further methods, which use the determination of a time lapse (timeout) in the data communications via communications system 200, and/or to methods, which monitor the proper routing of messages and the violation of it (routing violation).

In particular, according to further advantageous specific embodiments, the principle of the specific embodiments may be used to reduce a false positive rate of the other methods mentioned above, based on the use of the selective white list, that is, of second collection S2. According to investigations of the applicant, the other methods mentioned above tend to generate false-positive status messages, in particular, in transmission states of considered subscribers of communications system 200, in which transmission of particular messages is completely deactivated. In view of the second collection S2 according to the specific embodiments, the number of false-positive status messages of the other methods mentioned above may be advantageously reduced, for example, by deactivating the other methods at least temporarily for specifiable periods of time and/or to suppress such false-positive status messages.

Figure 6:
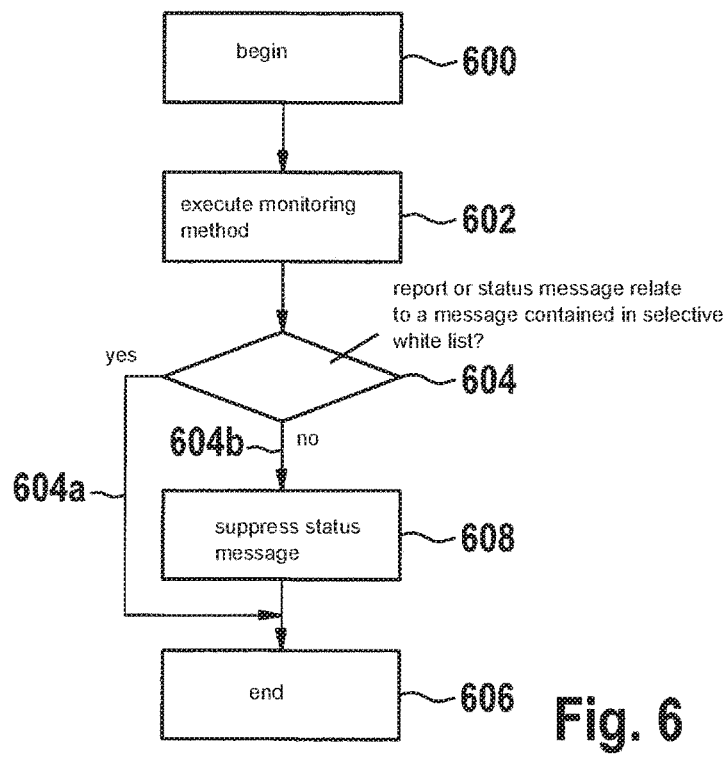
FIG. 6 shows a simplified flow chart of a method according to a further specific embodiment.

Therefore, in the following, aspects of further specific embodiments, which address the above-mentioned disadvantages of the other methods, are described by way of example, with reference to the flow chart according to FIG. 6. The method exemplarily described in light of FIG. 6 begins with step 600. In step 602, at least one of the other methods (for example, a monitoring method, which carries out monitoring as a function of the frequency of a particular message of a subscriber) is executed. In step 604, it is checked if a report or a status message possibly generated by the other method in step 602 relates to a message, which was ascertained in accordance with the principle of the specific embodiments (cf., for example, step 120 from FIG. 2A) and is also contained in second collection S2 (selective white list). If this is the case, cf. arrow 604a, the method branches to step 606, which defines an end of the method. However, if this is not the case, that is, the report or the status message from step 602 relates to a message, which is not contained in selective white list S2, then the method branches from step 604, via arrow 604b, to step 608, in which the status message or the report from step 602 is suppressed, which means that, in particular, an unwanted false-positive status message is prevented. The method then branches from step 608 to step 606 (end). It may be discerned from FIG. 6, that the status message or a report of the other method, as constituted in step 602, is not suppressed, in particular, cf. arrow 604a, if it relates to a message contained in selective white list S2.

Figure 7:
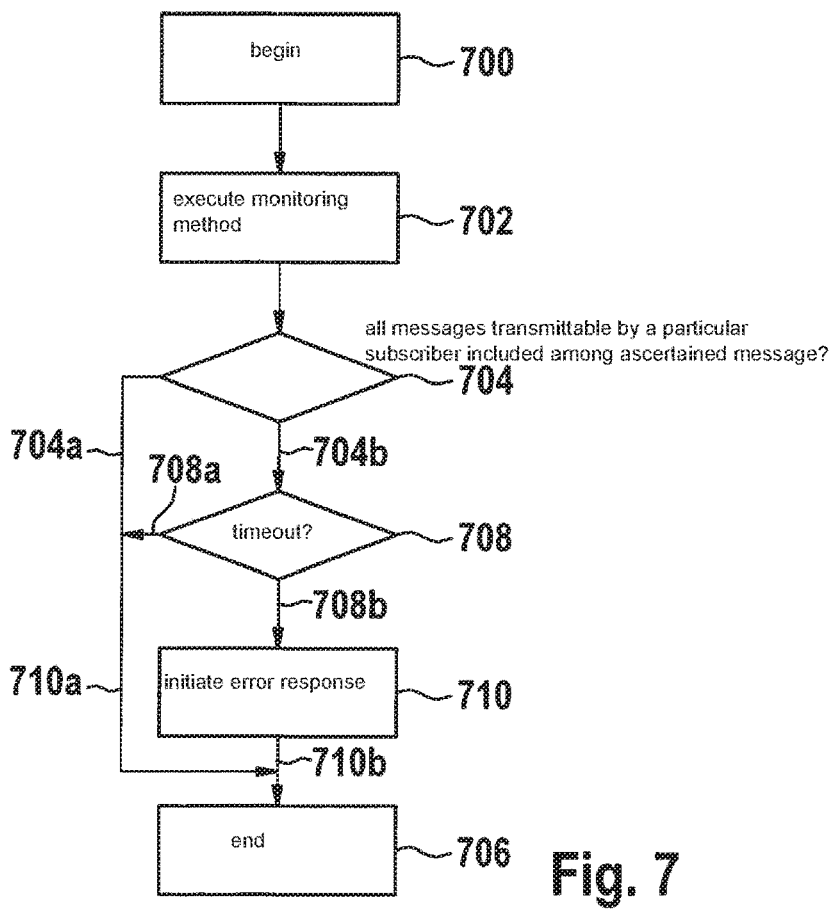
FIG. 7 shows a simplified flow chart of a method according to a further specific embodiment.

In the following, aspects of further preferred specific embodiments, which relate to detecting the unavailability of a subscriber of communications system 200, are described with reference to the simplified flow chart according to FIG. 7. The method begins with step 700. In optional step 702, a method, as was exemplarily described above with reference to step 602 in FIG. 6, is executed. Alternatively, the method according to FIG. 7 may also begin with step 704, that is, without carrying out step 702. In step 704, it is checked if all messages transmittable by a particular subscriber are included among the ascertained messages (cf. step 120 from FIG. 2A). If yes, the method branches, via arrow 704a, to step 706, in which the method is terminated. In this case, it is deduced that all expected messages of the particular subscriber considered have appeared at least one time each, and that therefore, no manipulation attempt is present.

However, if step 704 reveals that at least one of the messages transmittable by the particular subscriber is not included in the ascertained messages, then the method preferably branches, via arrow 704b, to step 708, in which it is checked if a threshold value of a time lapse (timeout) regarding the receipt of the message in question has been reached. If no, cf. arrow 708a, the method branches to block 706, as well. If yes, cf. arrow 708b, the method branches to step 710, in which the presence of a manipulation attempt or attack, in particular, a masquerade attack, is deduced, and in which in some instances, an error response is optionally initiated. For, in this connection, it may be inferred that an attacker has succeeded in manipulating the particular subscriber, for example, in deactivating it at least temporarily, for example, in order to falsify messages to be sent originally by the particular subscriber. Then, the method branches likewise to end block 706 (arrow 710b).

In further preferred specific embodiments, second collection S2 may optionally be taken into account in step 704 during the checking, which further increases the precision during the monitoring.

In further preferred specific embodiments, it is provided that the method include the following steps: checking if messages transmittable by a particular subscriber are contained in the ascertained messages; deducing a manipulation attempt, if some, but not all of the messages transmittable by the particular subscriber are included in the ascertained messages. This advantageously allows, e.g., communications or messages actually occurring to be compared to expected communications or messages for each subscriber. If, e.g., all of the communications of a subscriber are absent, this indicates its complete malfunction. If only a portion of the communications of a subscriber are absent, this indicates an attack (masquerade). In this connection, in further preferred specific embodiments, data of second collection S2 may optionally be considered during the checking, which further increases the precision during the monitoring.

In further, particularly preferred specific embodiments, the principle according to the specific embodiments is applied in real time; thus, data communications of communications system 200 occurring in real time are monitored. Alternatively, or in addition, the principle according to the specific embodiments may also be used for a forensic analysis of communications; the corresponding data, which are to be evaluated, being present, for example, in the form of one or more log files of a communications system or of at least one subscriber.

In further preferred specific embodiments, for example, the following scenarios of application are possible with reference to the schematic block diagram according to FIG. 1. For the following description, it is assumed, for example, that subscribers 210, 212, 214, 216 are each assigned to control units of a motor vehicle, and that communications system 200 is a communications system of the motor vehicle, for example, a CAN bus. For the following description, it is further assumed that subscriber 216 is a target of a planned masquerade attack, while the principle according to the specific embodiments is applied, by way of example, by the device 300 integrated in subscriber 210. In the present example, it is further assumed that the attacker is manipulating subscriber 214, in particular, using it to inject messages into communications system 200, which are normally sent by the other subscriber 216, and doing this in transmission states, in which other subscriber 216 would not send such messages, for example, based on its possible transmission states. A reason for this may be, for example, a regular transmission state of subscriber 216, in which it does not send any messages and/or does not send the corresponding messages, and/or an attack with the aid of further subscriber 214.

The methods and/or variants described above with reference to FIG. 2A through FIG. 7, and/or combinations of them, may be advantageously executed or used by device 300, in order to detect the masquerade attack through subscriber 214.

The principle according to the specific embodiments advantageously allows manipulation of the communications system and/or of at least one subscriber to be detected efficiently, without the provision of additional hardware, in particular, special hardware. In particular, this allows so-called man-in-the-middle attacks and/or masquerading attacks to be detected. Since the principle according to the specific embodiments is based on the consideration of ascertained messages and the evaluation of these messages, and not, for instance, on particular physical characteristics of one or more subscribers, a particularly low false-positive rate may be obtained, that is, a particularly low number of regular events mistakenly judged as a manipulation attempt, using the principle according to the specific embodiments. It is particularly preferable for the principle according to the specific embodiments to be used in a communications system of a vehicle, in particular, a motor vehicle, but it is not limited to this area. In addition, the principle according to the specific embodiments may be combined with other methods for monitoring the data communications in a communications system, which means that in some instances, a further increase in the precision and/or reliability is yielded, for example, due to the option of checking the respective results of the two methods for plausibility.

In further specific embodiments, ascertained messages may be evaluated and/or analyzed in an advantageous manner, using first collection S1 and/or second collection S2; for example, the following categories being conceivable: expected messages, unexpected messages, expected, but nonappearing messages. In this manner, particularly precise and detailed monitoring of the data communications in communications system 200 is rendered possible. In further preferred specific embodiments, the absence of expected messages and/or a frequency of messages may additionally be taken into account, which means that further anomalies in the data communications may be ascertained. According to further specific embodiments, attacks or instances of manipulation of communications system 200 or of at least one subscriber 210, . . . , 216 may be deduced from such anomalies. It is particularly advantageous that manipulation may be deduced, when in accordance with the transmission states considered, only some of all the messages transmittable by a subscriber are sent and/or ascertained.

What is claimed is:

1. A method for monitoring data communications in a communications system, which includes a plurality of subscribers and a communications medium jointly usable by the subscribers, the method comprising the following steps:
   ascertaining the subscribers of the communications system;
   forming a collection of possible messages that each has a respective message identification, which may be sent by at least one of the ascertained subscribers via the communications medium;
   ascertaining messages sent via the communications medium;
   evaluating the ascertained messages based on the formed collection of possible messages, thereby determining presence of an unauthorized manipulation of the communications system in response to:
      identifying in the communications medium presence of a message that is attributed to the at least one of the ascertained subscribers and that has a message identification that matches none of the message identifications of the collection of the possible messages;
      identifying, for a message having a message identification matching a particular one of the messages of the collection and that is transmitted by the at least one of the ascertained subscribers within a predefined period, a frequency at which the transmission occurred, and identifying that the identified frequency is different than a predefined frequency that is predefined for the particular one of the messages within the predefined period; or
      identifying, within a predefined amount of time, a combination of (a) presence of at least one of the messages of the collection in the communications medium and (b) no occurrence of at least one other of the messages of the collection in the communications medium, wherein the communications system is configured so that no occurrence of every one of the messages of the collection within the predefined amount of time is determined to represent a malfunction instead of the unauthorized manipulation; and
   initiating an error response to the identified unauthorized manipulation.

2. The method as recited in claim 1, further comprising: ascertaining in which one of a plurality of transmission states the at least one ascertained subscriber is, wherein the collection of possible messages is formed so that the collection varies depending on the ascertained one of the transmission states.

3. The method as recited in claim 2, wherein the at least one ascertained subscriber includes a plurality of the subscribers.

4. The method as recited in claim 2, wherein the at least one ascertained subscriber includes all of the ascertained subscribers.

5. The method as recited in claim 2, wherein the collection is updated repeatedly, the second collection being updated a) periodically and/or b) as a function of a current transmission state of the at least one ascertained subscriber, and/or c) as a function of at least one ascertained message.

6. The method as recited in claim 2, wherein the plurality of transmission states are power management states.

7. The method as recited in claim 2, wherein the ascertainment of the state is with respect to an activation of a boot loader.

8. The method as recited in claim 1, wherein the determining of the presence of the unauthorized manipulation is in response to the identifying, for the message having the message identification matching the particular one of the messages of the collection and that is transmitted by the at least one of the ascertained subscribers within the predefined period, the frequency at which the transmission occurred, and identifying that the identified frequency is different than the predefined frequency that is predefined for the particular one of the messages within the predefined period.

9. The method as recited in claim 8, wherein the identifying that the identified frequency is different includes determining that the identified frequency is below the predefined frequency.

10. The method as recited in claim 8, wherein the identifying that the identified frequency is different includes determining that the identified frequency exceeds the predefined frequency.

11. The method as recited in claim 1, wherein the determining of the presence of the unauthorized manipulation is in response to the identifying in the communications medium the presence of the message that is attributed to the at least one of the ascertained subscribers and that has the message identification that matches none of the message identifications of the collection of the possible messages.

12. The method as recited in claim 1, wherein the determining of the presence of the unauthorized manipulation is in response to the identifying, within the predefined amount of time, the combination of (a) the presence of the at least one of the messages of the collection in the communications medium and (b) the lack of occurrence of the at least one other of the messages of the collection in the communications medium, and wherein the communications system is configured so that the lack of occurrence of every one of the messages of the collection within the predefined amount of time is determined to represent the malfunction instead of the unauthorized manipulation.

13. The method as recited in claim 1, further comprising suppressing output of a warning of a detection of the unauthorized manipulation in response to a determination of a lack of presence in the communications medium of at least one of the messages of the collection.

14. A device for monitoring data communications in a communications system, the communications system including a plurality of subscribers that are configured to jointly use a communications medium, the device comprising a processor, wherein the processor is configured to:
ascertain the subscribers of the communications system;
form a collection of possible messages that each has a respective message identification, which may be sent by at least one of the ascertained subscribers via the communications medium;
ascertain messages sent via the communications medium;
evaluate the ascertained messages based on the formed collection of possible messages, thereby determining presence of an unauthorized manipulation of the communications system in response to:
identifying in the communications medium presence of a message that is attributed to the at least one of the ascertained subscribers and that has a message identification that matches none of the message identifications of the collection of the possible messages;
identifying, for a message having a message identification matching a particular one of the messages of the collection and that is transmitted by the at least one of the ascertained subscribers within a predefined period, a frequency at which the transmission occurred, and identifying that the identified frequency is different than a predefined frequency that is predefined for the particular one of the messages within the predefined period; or
identifying, within a predefined amount of time, a combination of (a) presence of at least one of the messages of the collection in the communications medium and (b) no occurrence of at least one other of the messages of the collection in the communications medium, wherein the communications system is configured so that no occurrence of every one of the messages of the collection within the predefined amount of time is determined to represent a malfunction instead of the unauthorized manipulation; and
initiate an error response to the identified unauthorized manipulation.

15. The device as recited in claim 14, wherein the processor is further configured to:
ascertain in which one of a plurality of transmission states the at least one ascertained subscriber is, wherein the collection of possible messages is formed so that the collection varies depending on the ascertained one of the transmission states.

16. A subscriber for a communications system which includes a plurality of subscribers including the subscriber, the plurality of subscribers being configured to jointly use a communications medium, the subscriber having a processor for monitoring data communications in the communications system, the processor configured to:
ascertain the subscribers of the communications system;
form a collection of possible messages that each has a respective message identification, which may be sent by at least one of the ascertained subscribers via the communications medium;
ascertain messages sent via the communications medium;
evaluate the ascertained messages based on the formed collection of possible messages, thereby determining presence of an unauthorized manipulation of the communications system in response to:
identifying in the communications medium presence of a message that is attributed to the at least one of the ascertained subscribers and that has a message identification that matches none of the message identifications of the collection of the possible messages;
identifying, for a message having a message identification matching a particular one of the messages of the collection and that is transmitted by the at least one of the ascertained subscribers within a predefined period, a frequency at which the transmission occurred, and identifying that the identified frequency is different than a predefined frequency that is predefined for the particular one of the messages within the predefined period; or
identifying, within a predefined amount of time, a combination of (a) presence of at least one of the messages of the collection in the communications medium and (b) no occurrence of at least one other of the messages of the collection in the communications medium, wherein the communications system is configured so that no occurrence of every one of the messages of the collection within the predefined amount of time is determined to represent a malfunction instead of the unauthorized manipulation; and initiate an error response to the identified unauthorized manipulation.

17. A communications system, comprising:

a plurality of subscribers, wherein a communications medium is jointly usable by the plurality of subscribers and wherein at least one device for monitoring data communications in the communications system is provided in the communications system and includes a processor that is configured to:

ascertain the subscribers of the communications system;

form a collection of possible messages that each has a respective message identification, which may be sent by at least one of the ascertained subscribers via the communications medium;

ascertain messages sent via the communications medium;

evaluate the ascertained messages based on the formed collection of possible messages, thereby determining presence of an unauthorized manipulation of the communications system in response to:

identifying in the communications medium presence of a message that is attributed to the at least one of the ascertained subscribers and that has a message identification that matches none of the message identifications of the collection of the possible messages;

identifying, for a message having a message identification matching a particular one of the messages of the collection and that is transmitted by the at least one of the ascertained subscribers within a predefined period, a frequency at which the transmission occurred, and identifying that the identified frequency is different than a predefined frequency that is predefined for the particular one of the messages within the predefined period; or identifying, within a predefined amount of time, a combination of (a) presence of at least one of the messages of the collection in the communications medium and (b) no occurrence of at least one other of the messages of the collection in the communications medium, wherein the communications system is configured so that no occurrence of every one of the messages of the collection within the predefined amount of time is determined to represent a malfunction instead of the unauthorized manipulation; and initiate an error response to the identified unauthorized manipulation;

wherein the communications system is a CAN system or a CAN FD system.

* * * * *